US008823677B2

(12) United States Patent
Huang et al.

(10) Patent No.: US 8,823,677 B2
(45) Date of Patent: Sep. 2, 2014

(54) TOUCH PANEL AND METHOD OF MANUFACTURING THE SAME

(75) Inventors: Jen-Shiun Huang, Hsinchu (TW); Tsung-Yi Lin, New Taipei (TW); Ming-Hui Chiang, New Taipei (TW); Wan-Tien Chen, Hsinchu County (TW); Wen-Jen Lee, Hsinchu County (TW)

(73) Assignee: E Ink Holdings Inc., Hsinchu (TW)

( * ) Notice: Subject to any disclaimer, the term of this patent is extended or adjusted under 35 U.S.C. 154(b) by 294 days.

(21) Appl. No.: 13/087,358

(22) Filed: Apr. 14, 2011

(65) Prior Publication Data

US 2012/0194467 A1    Aug. 2, 2012

(30) Foreign Application Priority Data

Jan. 27, 2011   (TW) .............................. 100103102 A

(51) Int. Cl.
*G06F 3/045*   (2006.01)
(52) U.S. Cl.
CPC ...... *G06F 3/045* (2013.01); *G06F 2203/04103* (2013.01)
USPC .......................................................... 345/174
(58) Field of Classification Search
None
See application file for complete search history.

(56) References Cited

U.S. PATENT DOCUMENTS

| 8,390,580 | B2 * | 3/2013 | Jiang et al. | 345/173 |
| 2003/0132920 | A1 * | 7/2003 | Lee et al. | 345/173 |
| 2005/0190161 | A1 * | 9/2005 | Hong et al. | 345/173 |
| 2007/0182718 | A1 | 8/2007 | Schoener et al. | |
| 2007/0263129 | A1 * | 11/2007 | Park et al. | 349/12 |
| 2010/0188360 | A1 * | 7/2010 | Joung et al. | 345/174 |
| 2010/0285844 | A1 * | 11/2010 | Hosoi et al. | 455/566 |
| 2010/0321330 | A1 | 12/2010 | Lim et al. | |
| 2011/0181530 | A1 * | 7/2011 | Park et al. | 345/173 |
| 2011/0242750 | A1 * | 10/2011 | Oakley | 361/679.27 |

FOREIGN PATENT DOCUMENTS

| CN | 101339314 A | 1/2009 |
| CN | 101566905 A | 10/2009 |
| CN | 101726889 A | 6/2010 |
| TW | 581971 B | 4/2004 |

OTHER PUBLICATIONS

Corresponding TW Office Action.
Corresponding CN Office Action.

* cited by examiner

*Primary Examiner* — Amare Mengistu
*Assistant Examiner* — Yaron Cohen
(74) *Attorney, Agent, or Firm* — CKC & Partners Co., Ltd.

(57) ABSTRACT

A touch panel and a method of manufacturing the same are disclosed in this invention. The touch panel is with a central induction region and a peripheral region, and at least includes an upper electrode portion having an upper substrate located in the central induction region and the peripheral region, a first signal induction layer located in the central induction region and the peripheral region, and a first circuit layer located in the peripheral region only. The first signal induction layer covers the upper substrate in the central induction region. The first circuit layer is sandwiched between the upper substrate and the first signal induction layer, and electrically connected the first signal induction layer.

7 Claims, 3 Drawing Sheets

TOUCH PANEL AND METHOD OF MANUFACTURING THE SAME

RELATED APPLICATIONS

This application claims priority to Taiwan Application Serial Number 100103102, filed Jan. 27, 2011, which is herein incorporated by reference.

BACKGROUND

1. Technical Field

The present invention relates to a touch panel, more particular to a resistive type of touch panel and its manufacturing method.

2. Description of Related Art

Recently, touch panels are broadly applied on a variety of electrical products (e.g. global positioning system, GPS, personal digital assistant, PDA, mobile phone and hand-held PC etc.) to be a new generation of input interfaces and to replace the tradition input interface such as keyboard and mouse etc. The application of touch panels not only elevates the friendliness of the human-machine interface, but also saves much room for placing a larger display panel after removing the tradition input device, so as the larger display for users can be convenient to review information thereon.

Traditionally, depending on different working principles, touch technologies of touch panels can be divided into an optical type, a supersonic type, an ultrared type, a capacitive type and a resistive type thereof in which the resistive type (i.e. film on glass) of the touch panels is still the most common type in the such electrical products.

The traditional resistive type of touch panels can be induced by a voltage detection method, and the traditional resistive type of touch panels includes an upper electrode portion, a lower electrode portion and a plurality of partition elements separately arranged between the upper electrode portion and the lower electrode portion. The upper electrode portion and the lower electrode portion are respectively provided with a transparent conductive glass (e.g. Indium Tin Oxide glass) and a transparent conductive film (e.g. Indium Tin Oxide film) in which each transparent conductive film is overlaid on the corresponding transparent conductive glass so as for users to touch.

However, the touch panel can be defined into an effective pressing inducing area (called central induction region hereinafter) and the edges of the touch panel (called peripheral region hereinafter) surrounding the central induction region. When a user operates the touch panel to touch/press a position in the central induction region neighboring to the peripheral region, the user normally needs to press hard to provide higher pressure on the touch panel for sending a operating signal. Thus, after doing that in many times, a so-called "Edge Effect" will be easy to happen, that is, the position of the transparent conductive film neighboring to the peripheral region is easy to get elastically fatigued, even to cause cracked, so as to reduce the product life of the transparent conductive film and then further to lead malfunction of the entire product in use.

As shown above, the conventional touch panel mentioned above obviously exists inconveniences and disadvantages which are needed to be improved. Thus, in order to solve the inconvenience and disadvantages, people in the related industrial field are desired to develop a solution for the inconvenience and disadvantages, but still can not provided a proper way to solve the inconvenience and disadvantages for a long time.

So how to effectively improve the structural strength of the transparent conductive film, especially to the structural strength of the transparent conductive film neighboring to the peripheral region so as to amplify the pressing endurance of the transparent conductive film, shall be concerned.

SUMMARY

The present invention is to disclose a touch panel which can intensify the structural strength of the transparent conductive film, especially to a position of the central induction region of the transparent conductive film neighboring to the peripheral region, so as to amplify the pressing endurance of the transparent conductive film and extend the product life.

In one embodiment of the present invention, the touch panel is defined with a central induction region and a peripheral region surrounding the central induction region. The touch panel at least includes an upper electrode portion, a lower electrode portion and a plurality of partition elements sandwiched between the upper electrode portion and the lower electrode portion in which the upper electrode portion includes an upper substrate, a first signal induction layer and a first circuit layer. The upper substrate is located in both the central induction region and the peripheral region. The first signal induction layer is located in both the central induction region and the peripheral region, and directly covers the upper substrate in the central induction region. The first circuit layer is located in the peripheral region only, directly covers the upper substrate in the peripheral region, and is sandwiched between the upper substrate and the first signal induction layer. Also, the first circuit layer and the first signal induction layer are electrically connected with each other, and an impedance value of the first circuit layer is lower than an impedance value of the first signal induction layer.

Specifically, the first signal induction layer integrally includes a first part, a second part and a first slope portion. The first part is located in the peripheral region only, and is directly contacted with the first circuit layer. The second part is located in the central induction region only, and is directly contacted with the first circuit layer and the upper substrate, and remains a vertical distance with the first part in altitude. The first slope portion is coupled with both the first part and the second part.

Therefore, since the first slope portion approaches the juncture of the central induction region and the peripheral region, and couples the first part and the second part together, thus, the first slope portion is increased in thickness of the position of the first signal induction layer in the central induction region neighboring to the peripheral region, so as to amplify the structural strength and the pressing endurance of the touch panel.

Also, in the embodiment, the lower electrode portion comprises a lower substrate, a second signal induction layer and a second circuit layer. The lower substrate is located in both the central induction region and the peripheral region. The second signal induction layer is located in both the central induction region and the peripheral region, and directly covers the lower substrate in the central induction region. The second circuit layer is located in the peripheral region only, directly covers the lower substrate in the peripheral region, and is sandwiched between the lower substrate and the second signal induction layer. Moreover, the second circuit layer and the second signal induction layer are electrically connected with each other, and an impedance value of the second circuit layer is lower than an impedance value of the second signal induction layer.

Specifically, the second signal induction layer integrally includes a third part, a fourth part and a second slope portion. The third part is located in the peripheral region only, and is directly contacted with the second circuit layer. The fourth part is located in the central induction region only, and is directly contacted with the second circuit layer and the lower substrate, and remains a vertical distance with the third part in altitude. The second slope portion is coupled with both the third part and the fourth part.

Therefore, since the second slope portion is near the juncture of the central induction region and the peripheral region, and is coupled with the third part and the fourth part together, thus, the second slope portion is increased in thickness of the position of the second signal induction layer in the central induction region neighboring to the peripheral region, so as to approach the first slope portion and reduce a vertical distance between the first signal induction layer and the second signal induction layer. Consequentially, the margin that the second part of the first signal induction layer is pressed towards the second signal induction layer will be relieved so as to lessen the damage that the first signal induction layer is deformed.

In one option of the embodiment, the material of the upper substrate and the lower substrate can be either a light-transmissive glass or a light-transmissive plastic.

In another option of the embodiment, the first circuit layer and the second circuit layer can be a conductive pattern, respectively.

In the other one option of the embodiment, the conductive pattern can be either a carbon slurry circuit or a silver slurry circuit.

In the other one option of the embodiment, a maximized vertical distance between the first slope portion and the second slope portion is smaller than a vertical distance between the second part and the fourth part.

In the other one option of the embodiment, the first signal induction layer and the second signal induction layer can be a conductive thin film, respectively.

In the embodiment, the touch panel further includes a dielectric layer and a sealant. The dielectric layer is sandwiched between the first part of the first signal induction layer and the third part of the second signal induction layer to electrically isolate the first part of the first signal induction layer and the third part of the second signal induction layer. The sealant is located in the peripheral region only, surrounds the central induction region, and directly sandwiched between the upper substrate and the lower substrate.

Another formation of the present invention is to disclose a method of manufacturing a touch panel. The method in one embodiment comprises steps of providing an upper substrate with a central induction region and a peripheral region surrounding the central induction region; forming a first electrode layer on the upper substrate in the peripheral region; forming a first signal induction layer on the upper substrate to both cover the first electrode layer and the upper substrate so as to form an upper electrode portion; forming a lower electrode portion; and stacking the upper electrode portion and the lower electrode portion together.

In the embodiment, the lower electrode portion is formed with following steps of providing a lower substrate with a central induction region and a peripheral region surrounding the central induction region; forming a second electrode layer on the lower substrate in the peripheral region; and forming a second signal induction layer on the lower substrate to both cover the second electrode layer and the lower substrate so as to, form the lower electrode portion.

To sum up, comparing to the prior art, the technical feature of the present invention is with obvious advantages and useful effects superior to the prior art. Thus, by adopting the technical feature of the present invention mentioned above, the present invention provides inventive step and usability, and also has broadly industrial applications. Especially, in the present invention, by thickening a position of the first signal induction layer neighboring to the peripheral region, the pressing endurance of the first signal induction layer can be amplified so as to extend the product life of the touch panel.

Also, as well as thickening a position of the second signal induction layer neighboring to the peripheral region, a vertical distance between the first signal induction layer and the second signal induction layer can be reduced, so as to lessen the damage that the first signal induction layer is deformed.

BRIEF DESCRIPTION OF THE DRAWINGS

The present invention will be apparent to those skilled in the art by reading the following detailed description of a preferred embodiment thereof, with reference to the attached drawings, in which.

DESCRIPTION OF THE PREFERRED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

In view of the position of the conventional transparent conductive film neighboring to the peripheral region thereof may easily get elastically fatigued, even to cause cracked after being pressed for many times, so that the product life of the conventional transparent conductive film of the touch panel will be reduced quickly so as to lead malfunction of the entire product in use. Therefore, the present invention is to disclose a touch panel for intensifying the structural strength of the transparent conductive film neighboring to the peripheral region, so as to amplify the pressing endurance of the transparent conductive film and extend the product life.

Figure 1:
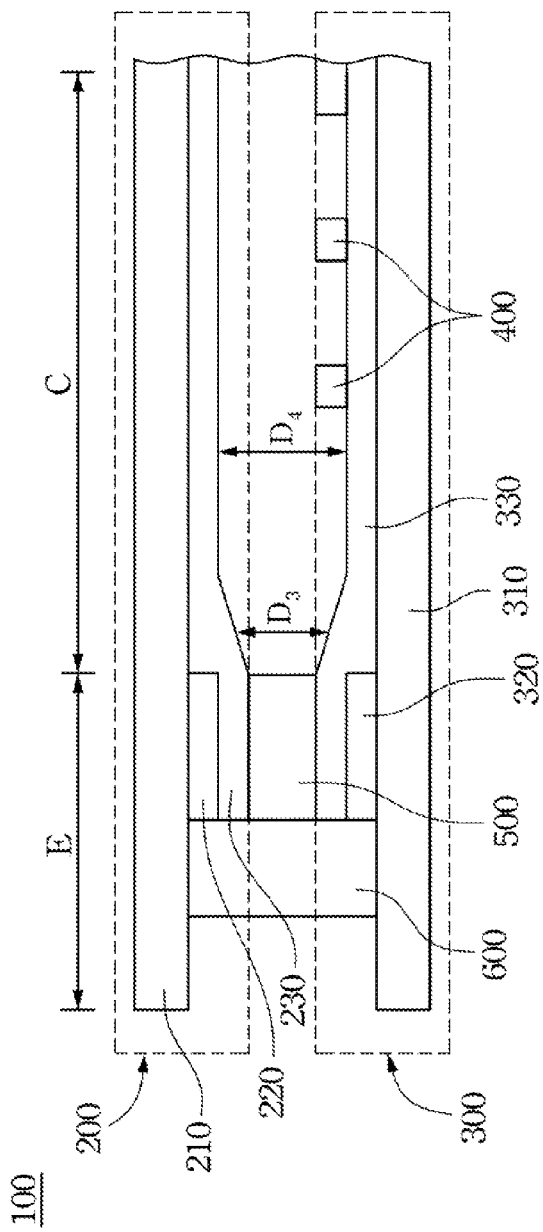
FIG. 1 is a partial sided view of a touch panel according to one embodiment of the present invention.

Refer to FIG. 1 in which FIG. 1 is a partial sided view of a touch panel 100 according to one embodiment of the present invention.

In the embodiment of the present invention, the touch panel 100 is defined into a central induction region C and a peripheral region E. The central induction region C is an effective pressing inducing area of the touch panel 100, and is surrounded by the peripheral region E thereof.

The touch panel 100 at least includes an upper electrode portion 200, a lower electrode portion 300, a plurality of partition elements 400, a dielectric layer 500, and a sealant 600. Because the upper electrode portion 200 might be too close to the lower electrode portion 300 after fabrication, thus, the upper electrode portion 200 might be possible to electrically conduct with the lower electrode portion 300 before the touch panel 100 is pressed. These partition elements 400 are sandwiched between the upper electrode portion 200 and the lower electrode portion 300 so as to prevent from the upper electrode portion 200 and the lower electrode portion 300 electrically conducted with each other before the touch panel 100 is pressed. These partition elements 400 for example, may be dot spacers.

The upper electrode portion 200 includes an upper substrate 210, a first circuit layer 220 and a first signal induction layer 230. The upper substrate 210 is located in both the central induction region C and the peripheral region E. The upper substrate 210 can be transparent or at least light transmittable; or opaque or not light transmittable. When the upper substrate 210 is not light transmittable, the material of the upper substrate 210 can be chosen from gold, silver, copper, copper alloy, aluminum, aluminum alloy, tin or the combination thereof. When the upper substrate 210 is light transmittable, the upper substrate 210 can be a glass substrate or a plastic substrate. The material of the plastic substrate can be chosen from Polyethylene Terephthalate (PET), Poly Carbonate (PC), polyethylene (PE), Poly Vinyl Chloride (PVC), Poly Propylene (PP), Poly Styrene (PS), Polymethylmethacrylate (PMMA) or a polymer made of the combination thereof.

The first circuit layer 220 is configured in the peripheral region E only, directly covers an inner surface of the upper substrate 210 in the peripheral region E, and surrounds the central induction region C. The first circuit layer 220 is provided with a conductive pattern. The conductive pattern is electrically connected with an external circuit (not shown in figures). The conductive pattern for example can be either a carbon slurry circuit or a silver slurry circuit with good electrical conduction and low impedance. The conductive pattern for example can be metallic lines with good electrical conduction and low impedance, and the material of the metallic lines can be chosen from gold, silver, copper, copper alloy, aluminum, aluminum alloy, tin or the combination thereof.

The first signal induction layer 230 is configured in both the central induction region C and the peripheral region E. The first signal induction layer 230 directly covers a surface of the first circuit layer 220 in the peripheral region E and the inner surface of the upper substrate 210 in the central induction region C. Therefore, the first circuit layer 220 is sandwiched between the upper substrate 210 and the first signal induction layer 230. Also, the first circuit layer 220 and the first signal induction layer 230 are electrically connected with each other, and an impedance value of the first circuit layer 220 is lower than an impedance value of the first signal induction layer 230.

Specifically, the first signal induction layer 230 can be a conductive thin film. The material of the conductive thin film can be chosen from Indium Tin Oxide (ITO), metal or Graphite. When the conductive thin film is made of Indium Tin Oxide, the conductive thin film can be formed by electroplating, evaporation or sputtering method.

Figure 2:
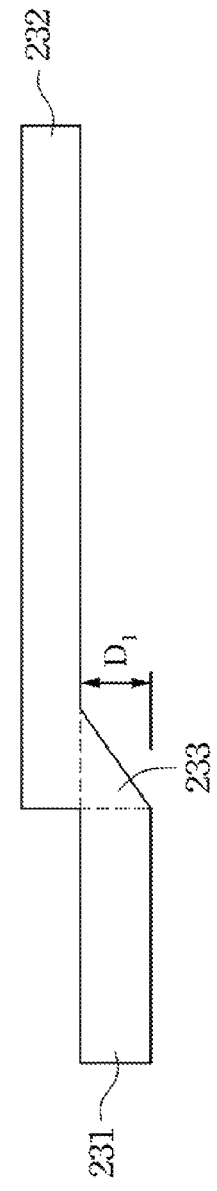
FIG. 2 is a schematic view of a first signal induction layer of the touch panel according to the embodiment.

Refer to FIG. 2 in which FIG. 2 is a schematic view of a first signal induction layer 230 of the touch panel 100 according to the embodiment.

The first signal induction layer 230 integrally includes a first part 231, a second part 232 and a first slope portion 233. The first part 231 is a part of the first signal induction layer 230 located in the peripheral region E, and is directly contacted and electrically connected with the first circuit layer 220. The second part 232 is another part of the first signal induction layer 230 located in the central induction region C, and is directly contacted with the first circuit layer 220 and the upper substrate 210. As shown in FIG. 2, the first part 231 and the second part 232 are not at a same level, that is, a vertical distance D1 is remained between the second part 232 and the first part 231 in altitude. The first slope portion 233 is located in the central induction region C neighboring to the peripheral region E, couples the second part 232 with one side thereof, and couples the first part 231 with another side thereof neighboring to the upper substrate 210. Therefore, a height of the first slope portion 233 is approximately equal to the vertical distance D1.

Figure 3:
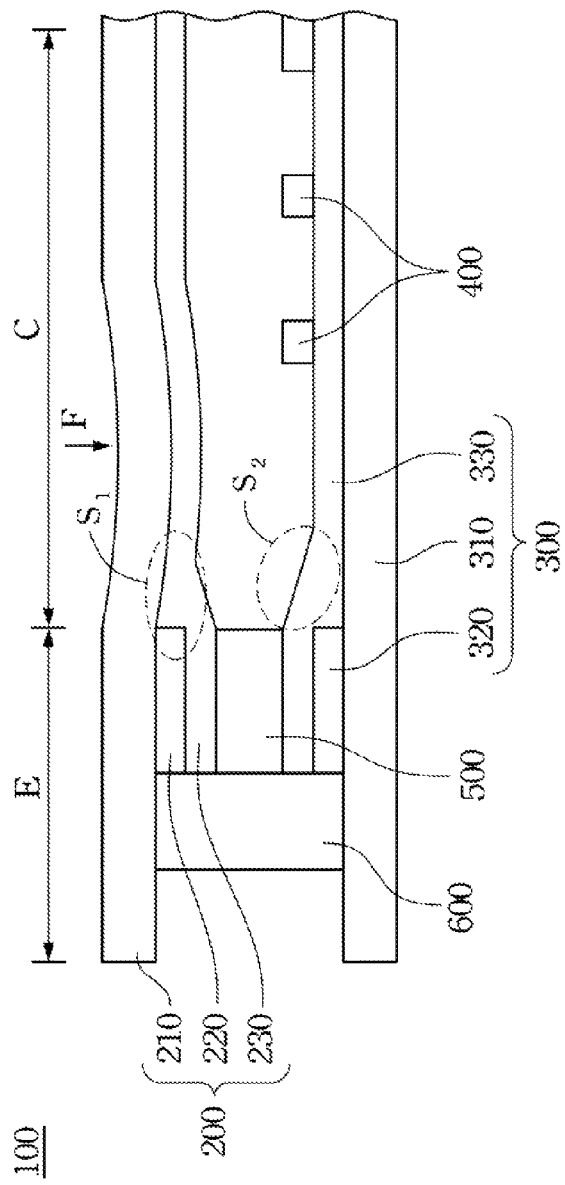
FIG. 3 is an operation schematic view of the touch panel when being pressed.

Thus, refer to FIG. 3 in which FIG. 3 is an operation schematic view of the touch panel 100 when being pressed.

When a user exerts a pressing force F on a position of the upper substrate 210 in the central induction region C neighboring to the peripheral region E to press the first signal induction layer 230 (see dotted lined circle S1), since the first slope portion 233 and the second part 232 thicken the thickness of the position (see dotted lined circle S1) of the first signal induction layer 230 in the central induction region C neighboring to the peripheral region E, thus, the better pressing endurance and the structural strength of the first signal induction layer 230 can be provided to be against the pressing force F so that the position (see dotted lined circle S1) can not be quickly get elastically fatigued, so as to extend the product life of the touch panel 100.

Refer to FIG. 1 again. The lower electrode portion 300 comprises a lower substrate 310, a second signal induction layer 330 and a second circuit layer 320. The lower substrate 310 is configured in both the central induction region C and the peripheral region E. The lower substrate 310 can be transparent or at least light transmittable; or opaque or not light transmittable. When the lower substrate 310 is not light transmittable, the material of the lower substrate 310 can be same as the upper substrate 210 described as above. When the lower substrate 310 is light transmittable, the lower substrate 310 can be a glass substrate or a plastic substrate. The material of the plastic substrate can be the same described above.

The second circuit layer 320 is configured in the peripheral region E only. The second circuit layer 320 directly covers an inner surface of the lower substrate 310 in the peripheral region E, and surrounds the central induction region C. The second circuit layer 320 is provided with a conductive pattern. The conductive pattern is electrically connected with another external circuit different from the one that the first circuit layer 220 connects with. The conductive pattern for example can be either a carbon slurry circuit or a silver slurry circuit with good electrical conduction and low impedance. The conductive pattern for example can be metallic lines with good electrical conduction and low impedance, and the material of the metallic lines can be the same described above.

The second signal induction layer 330 is configured in both the central induction region C and the peripheral region E. The second signal induction layer 330 directly covers a surface of the second circuit layer 320 in the peripheral region E and the inner surface of the lower substrate 310 in the central induction region C. Therefore, the second circuit layer 320 is sandwiched between the lower substrate 310 and the second signal induction layer 330. Also, the second circuit layer 320 and the second signal induction layer 330 are electrically connected with each other, and an impedance value of the second circuit layer 320 is lower than an impedance value of the second signal induction layer 330. Specifically, the second signal induction layer 330 can be a conductive thin film. The material of the conductive thin film can be the same described above.

Figure 4:
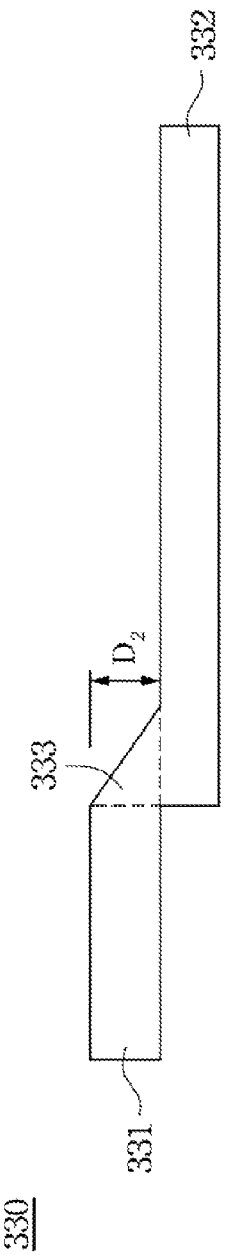
FIG. 4 is a schematic view of a second signal induction layer of the touch panel according to the embodiment.

Refer to FIG. 4 in which FIG. 4 is a schematic view of a second signal induction layer of the touch panel according to the embodiment.

The second signal induction layer 330 integrally includes a third part 331, a fourth part 332 and a second slope portion 333. The third part 331 is a part of the second signal induction layer 330 located in the peripheral region E, and is directly contacted and electrically connected with the second circuit layer 320. The fourth part 332 is another part of the second signal induction layer 330 located in the central induction region C, and is directly contacted with the second circuit layer 320 and the lower substrate 310. As shown in FIG. 4, the third part 331 and the fourth part 332 are not at a same level, that is, a vertical distance D2 is remained between the fourth part 332 and the third part 331 in altitude.

Therefore, refer to FIG. 3 again, when the user exerts a pressing force F on a position of the upper substrate 210 in the central induction region C neighboring to the peripheral region E to press the first signal induction layer 230 (see dotted lined circle S1), since the second slope portion 333 and the fourth part 332 thicken the thickness of the position (see dotted lined circle S2) of the second signal induction layer 330 in the central induction region C neighboring to the peripheral region E. Thus, a vertical distance exited between the first signal induction layer 230 and the second signal induction layer 330 can be therefore shortened. Consequentially, when the position (see dotted lined circle S1) of the first signal induction layer 230 neighboring to the peripheral region E is pressed, the margin that the position of the first signal induction layer 230 in the central induction region C neighboring to the peripheral region E can be relieved so as to lessen the damage that the first signal induction layer is deformed, and the position (see dotted lined circle S1) can not be quickly get elastically fatigued, so as to extend the product life of the touch panel 100.

The dielectric layer 500 is sandwiched between the first part 231 of the first signal induction layer 230 and the third part 331 of the second signal induction layer 330 to electrically isolate the first part 231 of the first signal induction layer 230 and the third part 331 of the second signal induction layer 330. The sealant 600 is configured in the peripheral region E only, surrounds the central induction region C, and directly sandwiched between the upper substrate 210 and the lower substrate 310.

Furthermore, refer to FIG. 1 again, the dielectric layer 500 is located in the peripheral region E to surround the central induction region C, and is sandwiched between the first part 231 thereof and the third part 331 thereof to electrically isolate the first part 231 and the third part 331 so as to prevent from the first part 231 electrically conducting with the third part 331 before the touch panel 100 is pressed. The sealant 600 is located in the peripheral region E, surrounds the central induction region C, and directly sandwiched between the upper substrate 210 and the lower substrate 310 so as to prevent from the partition elements 400 leaking out or external things penetrated into the touch panel 100.

Figure 5:
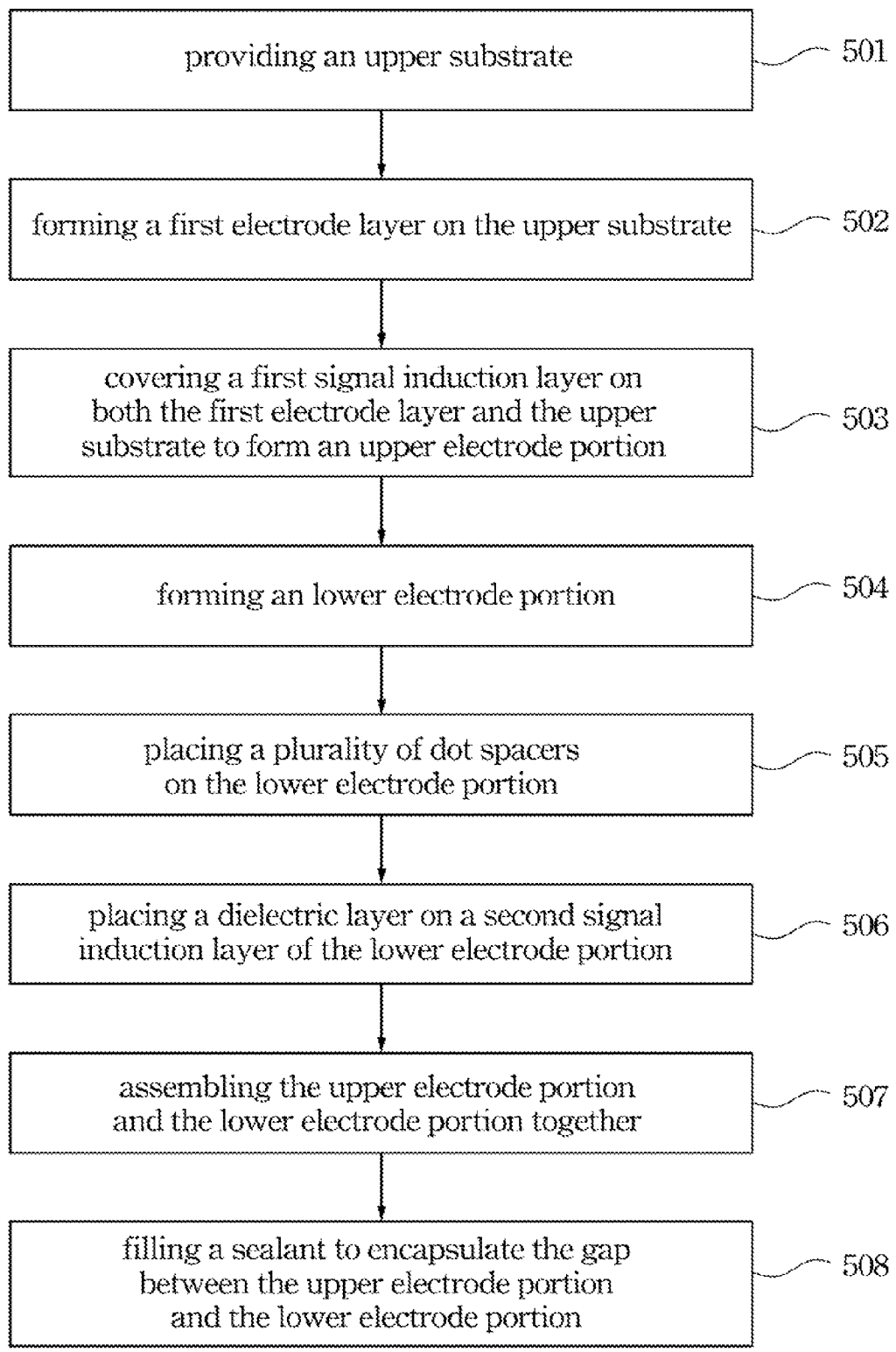
FIG. 5 is a flowchart of a method of manufacturing the touch panel according to one embodiment of the present invention.

Refer to FIG. 1 and FIG. 5 in which FIG. 5 is a flowchart of the method of manufacturing the touch panel 100 according to one embodiment of the present invention.

In the embodiment, the method of manufacturing the touch panel 100 includes steps as follows.

Step (501): providing an upper substrate 210 mentioned above, the upper substrate 210 is defined into a central induction region C and a peripheral region E surrounding the central induction region. The material of the upper substrate 210 can be selected as described above.

Step (502): forming a first electrode layer 220 mentioned above on the upper substrate 210 in the peripheral region E.

Exemplarily, in the step, by screen-printing technology, printing a silver paste on an inner surface of the upper substrate 210 in the peripheral region E so as to form the first electrode layer 220. However, the method for forming the first electrode layer 220 is not limited to screen-printing technology only.

Step (503): forming a first signal induction layer 230 mentioned above to cover both the first electrode layer 220 and the upper substrate 210 so the first signal induction layer 230 covers a surface of the upper substrate 210 in the central induction region C, and covers a surface of the first electrode layer 220 in the peripheral region E. Thus, the upper substrate 210, the first electrode layer 220 and the first signal induction layer 230 are formed into an upper electrode portion 200.

Exemplarily, in the step, the first signal induction layer 230 can be formed as a transparent conductive thin film by depositing Indium Tin Oxide (ITO) on both the upper substrate 210 and the first electrode layer 220 through a method of electroplating, evaporation or sputtering. However, the method for forming the first signal induction layer 230 is not limited to electroplating, evaporation or sputtering only.

Step (504): forming a lower electrode portion 300 mentioned above. The lower electrode portion 300 can be made by the well-known technology; or made by the method same as Step (501) to Step (503), which are described as follows. (i) providing a lower substrate 310 defined into a central induction region C and a peripheral region E surrounding the central induction region C; (ii) forming a second electrode layer 320 on the lower substrate 310 in the peripheral region E; and (iii) forming a second signal induction layer 330 on the lower substrate 310 to both cover the second electrode layer 320 and the lower substrate 310 so as to form the lower electrode portion 300.

Step (505): placing a plurality of partition elements 400 on either the upper electrode portion 200 or the lower electrode portion 300.

Exemplarily, in the step, by screen-printing technology, applying some dot spacer on a surface of the second signal induction layer 330 in the central induction region C. However, the method for placing the partition elements 4 is not limited to screen-printing technology only. In the step, the dot spacer also can be applied on a surface of the first signal induction layer 230 in the central induction region C.

Step (506): placing a dielectric layer 500 on the surface of the second signal induction layer 330 (or the first signal induction layer 230) in the peripheral region E, and the dielectric layer 500 surrounds the central induction region C.

Exemplarily, in the step, covering the dielectric layer 500 with electrical isolation property on the second signal induction layer 330 in the peripheral region E. In other embodiments, the dielectric layer 500 can be adhered on the surface of the second signal induction layer 330 by a double-sided adhesive (e.g. pressure sensitive adhesive, PSA) or liquid glue. However, the method for placing the dielectric layer 500 is not limited to it. In the step, the dielectric layer 500 also can be adhered on a surface of the first signal induction layer 230 in the central induction region C.

Step (507): assembling the upper electrode portion 200 and the lower electrode portion 300 together so that the first signal induction layer 230 of the upper electrode portion 200 and the second signal induction layer 330 of the lower electrode portion 300 are facing with each other, and the dielectric layer 500 prevents from the first signal induction layer 230 and the second signal induction layer 330 electrically conducted with each other, and the partition elements 400 partitions the first signal induction layer 230 and the second signal induction layer 330 with each other.

Step (508): filling a sealant 600 mentioned above to encapsulate the gap between the upper electrode portion 200 and the lower electrode portion 300. The sealant 600 surrounds the dielectric layer 500 in the peripheral region E, and the signal induction layers 230, 330, the electrode layers 220, 230, and the partition elements 400 in the central induction region C so as to prevent from the partition elements 400 leaking out or external things penetrated into the touch panel 100.

To sum up, by thickening a position of the first signal induction layer neighboring to the peripheral region, the pressing endurance of the first signal induction layer can be amplified so as to extend the product life of the touch panel. Also, by thickening a position of the second signal induction layer neighboring to the peripheral region, so as to reduce a vertical distance between the first signal induction layer and the second signal induction layer, and then lessen the damage that the first signal induction layer is deformed.

Although the present invention has been described with reference to the preferred embodiments thereof, it is apparent to those skilled in the art that a variety of modifications and changes may be made without departing from the scope of the present invention which is intended to be defined by the appended claims.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A touch panel with a central induction region and a peripheral region surrounding the central induction region, the touch panel at least comprising an upper electrode portion, a lower electrode portion and a plurality of partition elements sandwiched between the upper electrode portion and the lower electrode portion, the upper electrode portion comprising:
    an upper substrate located in both the central induction region and the peripheral region;
    a first signal induction layer located in both the central induction region and the peripheral region, and directly covering the upper substrate in the central induction region; and
    a first circuit layer located in the peripheral region only, directly covering the upper substrate in the peripheral region, and sandwiched between the upper substrate and the first signal induction layer,
    wherein the first circuit layer and the first signal induction layer are electrically connected with each other, and an impedance value of the first circuit layer is lower than an impedance value of the first signal induction layer
    wherein the first signal induction layer integrally comprises: a first part located in the peripheral region only, and directly contacted with the first circuit layer; a second part located in the central induction region only, and directly contacted with the first circuit layer and the upper substrate, and remaining a vertical distance with the first part in altitude; and a first slope portion coupled with both the first part and the second part.

2. The touch panel according to claim 1, wherein the lower electrode portion comprises:
    a lower substrate located in both the central induction region and the peripheral region;
    a second signal induction layer located in both the central induction region and the peripheral region, and directly covering the lower substrate in the central induction region; and
    a second circuit layer located in the peripheral region only, directly covering the lower substrate in the peripheral region, and sandwiched between the lower substrate and the second signal induction layer,
    wherein the second circuit layer and the second signal induction layer are electrically connected with each other, and an impedance value of the second circuit layer is lower than an impedance value of the second signal induction layer.

3. The touch panel according to claim 2, wherein the second signal induction layer integrally comprises:
    a third part located in the peripheral region only, and directly contacted with the second circuit layer;
    a fourth part located in the central induction region only, and directly contacted with the second circuit layer and the lower substrate, and remaining a vertical distance with the third part in altitude; and
    a second slope portion coupled with both the third part and the fourth part.

4. The touch panel according to claim 3, wherein a maximized vertical distance between the first slope portion and the second slope portion is smaller than a vertical distance between the second part and the fourth part.

5. The touch panel according to claim 2, wherein the material of the upper substrate and the lower substrate is light-transmissive glass or plastic.

6. The touch panel according to claim 2, wherein the first circuit layer and the second circuit layer are conductive patterns.

7. The touch panel according to claim 2, wherein the first signal induction layer and the second signal induction layer are conductive thin films.

* * * * *